(Model.)
P. McCOURT.
LOOSE PULLEY.
No. 248,485. Patented Oct. 18, 1881.
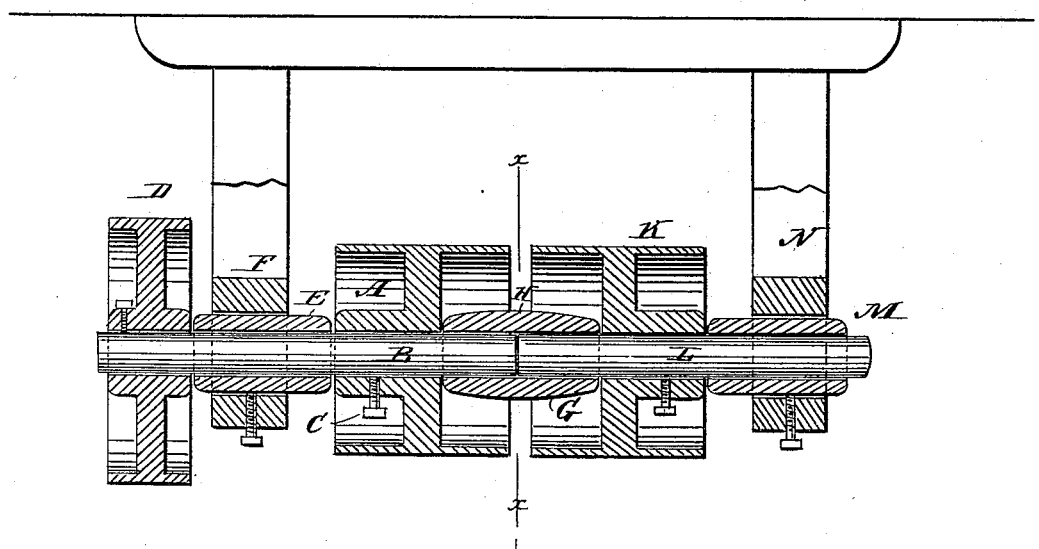
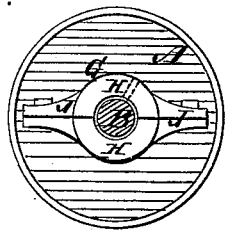
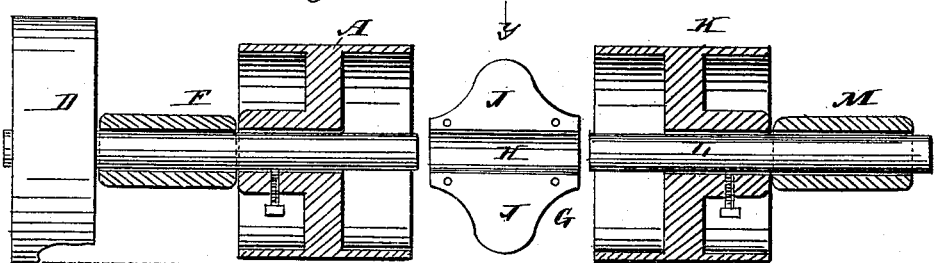
WITNESSES:
Francis McArdle.
C. Sedgwick.
INVENTOR:
P. McCourt
BY Munn & Co.
ATTORNEYS.

UNITED STATES PATENT OFFICE.

PETER McCOURT, OF GRAND HAVEN, MICHIGAN, ASSIGNOR TO HIMSELF AND GEORGE L. STEARNS, OF SAME PLACE.

LOOSE PULLEY.

SPECIFICATION forming part of Letters Patent No. 248,485, dated October 18, 1881.

Application filed August 10, 1881. (Model.)

*To all whom it may concern:*

Be it known that I, PETER McCOURT, of Grand Haven, in the county of Ottawa and State of Michigan, have invented a new and Improved Loose Pulley, of which the following is a specification.

The object of my invention is to prevent the rapid wearing off of the bearing of the loose pulley, whereby the rattling noise commonly produced by these loose pulleys is avoided.

The invention consists in a pulley rigidly mounted on a shaft having a bearing in its hanger and having its end fitting loosely in a box loosely mounted on the end of the shaft on which the driving-pulley is mounted, so that the loose pulley will not revolve loosely on its shaft, but the independent shaft of this pulley will rotate in its bearings.

In the accompanying drawings, Figure 1 is a longitudinal sectional elevation of a set of pulleys provided with my improvements, on the line $y\ y$, Fig. 2. Fig. 2 is a cross-sectional elevation of the same on the line $x\ x$, Fig. 1. Fig. 3 is a horizontal sectional view of the same.

Similar letters of reference indicate corresponding parts.

The driving-pulley A is mounted on a shaft, B, and held thereon by a screw, C, key, or other equivalent device, and a pulley, D, for receiving a belt for the transmission of power is also rigidly mounted on this shaft. This shaft B passes through a bearing-sleeve, E, held in a hanger, F; or this shaft can be journaled in this hanger F in some other suitable manner. The inner half of the hub of the pulley A is removed—that is to say, there is no central annular projection from that side of the pulley-disk opposite the one facing toward the hanger F; but the shaft B projects from this surface of the pulley-disk a slight distance beyond the edge of the rim of the pulley. A box, G, formed of two half-cylinders, H H, provided with wings J J, united by bolts and nuts, is loosely mounted on the end of the shaft B. A pulley, K, is rigidly secured on a shaft, L, passing through a bearing-sleeve, M, held in a hanger, N, and which shaft L also fits loosely in the box G, which is of such length that when its ends touch the adjoining surfaces of the pulleys A and K the rims of these pulleys will be separated sufficiently to admit passing an oil-can in between these rims. Both the shafts B and L are to be very short—that is, their length is to be equal to the length of the bearing-sleeve E or M and the width of the pulley. The shaft B must necessarily be somewhat longer, so as to permit securing the pulley D thereon. The box G always remains in a horizontal position—that is to say, its wings J are horizontal, and this box never rotates, neither with the shaft B nor with the shaft L. The wings J tend to retain this box in its horizontal postion, as the weight of these wings will prevent the shafts from rotating this box. The shaft B will thus have a bearing in the hanger F and in the box G, and likewise the shaft L has a bearing in the hanger N and in the box G. It is to be distinctly understood that the box G fits loosely on the ends of the shafts A and B, and does not couple these two shafts.

The operation is as follows: If the driving-belt is on the pulley A, the same, the shaft B, and the pulley D will be revolved, and the power can be transmitted from the pulley D to some other machinery. When the pulley A revolves the pulley K is stationary, and when the pulley K revolves the pulley A will be stationary.

Having thus fully described my invention, I claim as new and desire to secure by Letters Patent—

1. The combination, with a driving-pulley and its loose pulley, of the journaled shaft of the driving-pulley and the journaled shaft of the loose pulley, substantially as shown and described, and for the purpose set forth.

2. The combination, with the driving-pulley A and the loose pulley K, of the shafts B and L and of the box G, for receiving the ends of the shafts B and L, on which ends it is loosely mounted, substantially as herein shown and described, and for the purpose set forth.

3. The pulleys A K, constructed substantially as herein shown and described, with the inner half of their hubs removed, as and for the purpose set forth.

PETER McCOURT.

Witnesses:
 J. M. LOCKIE,
 I. J. CILLEY.